(12) United States Patent
Epema

(10) Patent No.: US 9,723,815 B2
(45) Date of Patent: Aug. 8, 2017

(54) FEEDING APPARATUS FOR SUPPLYING FEED TO A TROUGH AND A METHOD OF MONITORING THE FUNCTIONING OF SUCH A FEEDING APPARATUS

(71) Applicant: LELY PATENT N.V., Maassluis (NL)

(72) Inventor: David Epema, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 159 days.

(21) Appl. No.: 14/421,415

(22) PCT Filed: Jul. 19, 2013

(86) PCT No.: PCT/NL2013/050546
§ 371 (c)(1),
(2) Date: Feb. 12, 2015

(87) PCT Pub. No.: WO2014/030994
PCT Pub. Date: Feb. 27, 2014

(65) Prior Publication Data
US 2015/0181838 A1    Jul. 2, 2015

(30) Foreign Application Priority Data

Aug. 22, 2012 (NL) .................................... 2009339
Dec. 20, 2012 (NL) .................................... 2010026

(51) Int. Cl.
*A01K 5/00*   (2006.01)
*G01L 1/14*   (2006.01)
(Continued)

(52) U.S. Cl.
CPC .............. *A01K 5/0275* (2013.01); *A01K 5/01* (2013.01); *A01K 5/02* (2013.01); *A01K 5/0225* (2013.01);
(Continued)

(58) Field of Classification Search
CPC .......... A01K 5/01; A01K 5/02; A01K 5/0225; A01K 5/0275; A01K 5/0283; G01L 1/14; G01L 1/16; G01L 5/0052
(Continued)

(56) References Cited

U.S. PATENT DOCUMENTS 3,133,607 A * 5/1964 Gardner ................. G01G 13/00
                                                          177/108
3,678,902 A * 7/1972 Ruth .................... A01K 5/0291
                                                          119/51.11
(Continued)

FOREIGN PATENT DOCUMENTS

EP    0 152 388 A2    8/1985
NL    1023086 C1    5/2003
(Continued)

*Primary Examiner* — Joshua Rodden
(74) *Attorney, Agent, or Firm* — Birch, Stewart, Kolasch & Birch, LLP

(57) ABSTRACT

A feeding apparatus is provided for supplying feed to a trough. The feeding apparatus includes a plurality of feed dispensers having respective outlets. The feeding apparatus further includes a slide, the slide being positioned below the outlets to receive feed falling from the outlets and guide the feed towards the trough. The slide includes a plurality of impact detectors located below the respective outlets to detect impact of feed on the slide.

19 Claims, 4 Drawing Sheets

Figure 1:
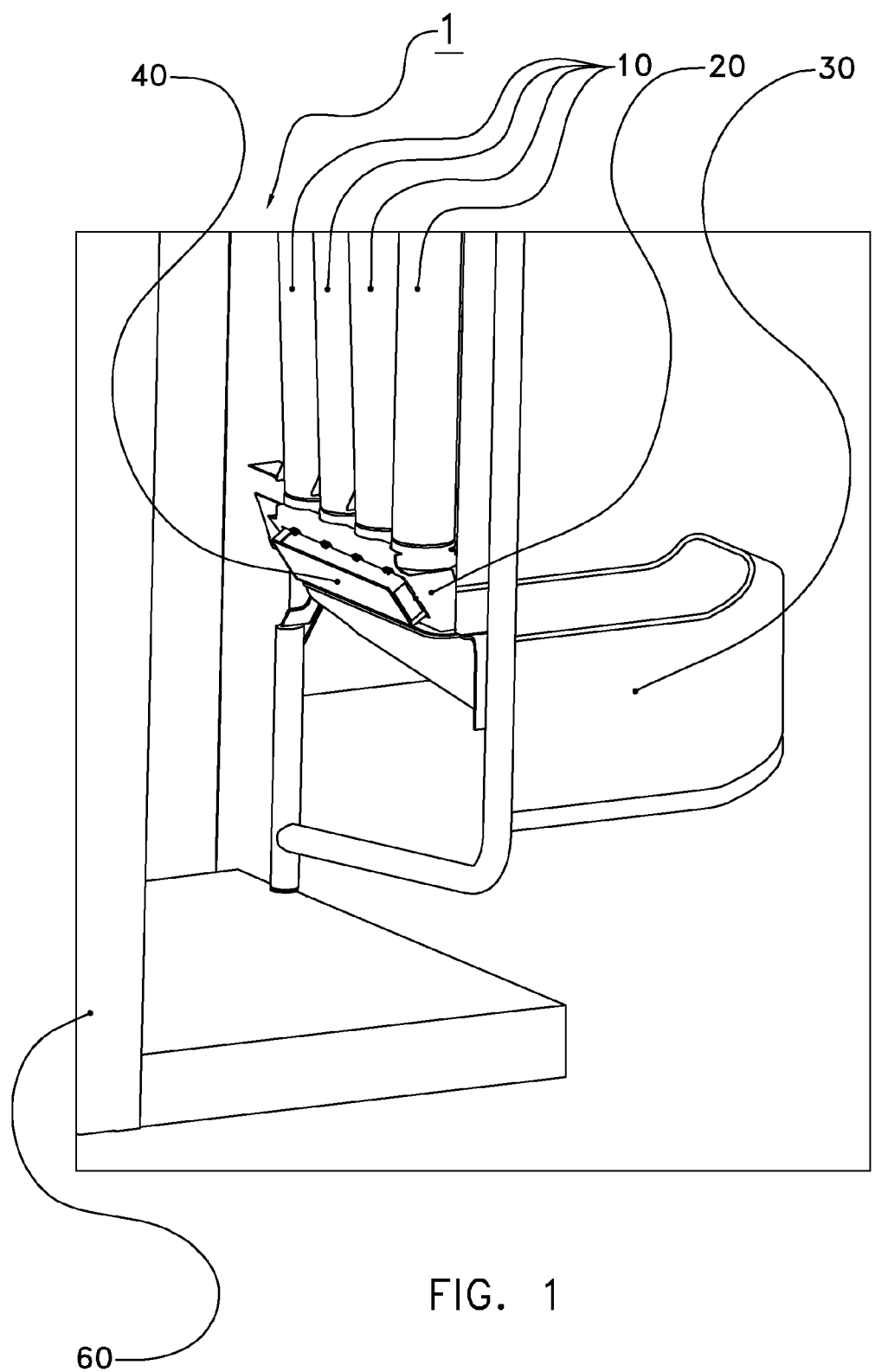

(51) Int. Cl.
*A01K 5/02* (2006.01)
*A01K 5/01* (2006.01)
*G01L 1/16* (2006.01)
*G01L 5/00* (2006.01)

(52) U.S. Cl.
CPC .................. *G01L 1/14* (2013.01); *G01L 1/16* (2013.01); *G01L 5/0052* (2013.01)

(58) Field of Classification Search
USPC ........................................................ 119/52.1
See application file for complete search history.

(56) References Cited

U.S. PATENT DOCUMENTS

| | | | | |
|---|---|---|---|---|
| 3,888,390 | A * | 6/1975 | Grau | A01K 5/0275 222/28 |
| 5,103,401 | A * | 4/1992 | Johnson | G05D 7/0623 177/105 |
| 5,424,957 | A * | 6/1995 | Kerkhoff | A01K 5/0275 119/51.02 |
| 5,559,716 | A * | 9/1996 | Gaalswyk | A01K 5/02 119/51.02 |
| 5,615,552 | A * | 4/1997 | Shimasaki | F01N 3/22 60/277 |
| 5,816,191 | A * | 10/1998 | Beaudoin | A01K 5/0258 119/51.02 |
| 6,234,111 | B1 * | 5/2001 | Ulman | A01K 1/031 119/51.02 |
| 6,845,735 | B1 * | 1/2005 | Northrop | A01K 5/0225 119/52.1 |
| 2002/0124804 | A1 * | 9/2002 | Fransen | A01K 5/0225 119/52.1 |
| 2007/0028844 | A1 * | 2/2007 | Bodenstab | A01K 5/0225 119/52.1 |

FOREIGN PATENT DOCUMENTS

| | | |
|---|---|---|
| WO | WO 01/08472 A1 | 2/2001 |
| WO | WO 2010/025526 A1 | 3/2010 |

* cited by examiner

FEEDING APPARATUS FOR SUPPLYING FEED TO A TROUGH AND A METHOD OF MONITORING THE FUNCTIONING OF SUCH A FEEDING APPARATUS

TECHNICAL FIELD

The invention relates to a feeding apparatus for supplying feed to a trough, the feeding apparatus comprises one or more feed dispenser having respective outlets, the feeding apparatus further comprising a slide, the slide being positioned below the outlets to receive feed falling from the outlets and guide the feed towards the trough. The invention further relates to a method of monitoring functioning of such a feeding apparatus, a computer program product comprising instructions which can be loaded by a computer device and when loaded enable the computer device to perform such a method, a computer readable medium comprising such a computer program product and a computer device arranged to perform such a method.

PRIOR ART

Feeding apparatus for supplying feed to cattle are known. An example of such a feeding apparatus is for instance provided by WO01/08472. Such a feeding apparatus may for instance be used in a milking machine for supplying feed to an animal during milking.

WO01/08472 describes a feeding apparatus which comprises hoppers in which different sorts of concentrate can be stored. Near the lower end of each hopper there is provided a metering unit by means of which continuously or periodically concentrate can be poured from the hopper into a conveyor channel. The outlet of the conveyor channel is situated above a manger.

WO01/08472 addresses the problem that air exhaled by the animal during eating penetrates into the conveyor channel and condenses against the wall thereof, so that remains of the concentrate cake against the wall of the conveyor channel, which may lead to clogging and/or bad discharge of the feed.

According to WO01/08472 such a situation may be detected by providing detection means which supply a signal when the walls of the conveyor channel are contaminated and/or the conveyor channel is clogged. The detection means comprise a sensor which is disposed in the conveyor channel and by means of which the wall of the conveyor channel can be examined. The sensor may be an optic, an acoustical or a mechanical sensor.

WO2010/025526A1 describes a livestock feed delivery system with a sensor. The sensor is adapted for placement in a delivery path of feed whereby said feed impacts the sensor and the sensor has a load cell including means to measure the flow rate of the feed during a feed episode. From the measured flow rate, the weight of feed delivered can be calculated.

Feeding apparatus are also known in which there is provided a slide between the outlet of the hopper and the manger to catch the feed discharged from the hopper and to guide the feed into the manger. This may for instance be useful in cases where the outlet of the hopper cannot be situated directly above the manger.

EP152388 describes a method and apparatus for measuring the flow rate of a flowable material, such as liquids and granular or powdered solid material. According to this document a method of measuring the flow rate of a flowable material is provided wherein the material is caused to meet a flow-measuring surface at an angle, the surface being inclined in relation to the horizontal plane and an inertial force proportional to the flow rate and acting on the surface is sensed by means of sensors emitting an output signal dependant on the flow rate. The deflection caused by inertial force is sensed by piezo resistive elements.

Malfunction of a feeding apparatus may cause severe damage to a farmer, as it may result in a decrease of milk yield. The feeding apparatus known from the prior art fail to detect malfunction of a feeding apparatus in a fast and reliable way.

BRIEF DESCRIPTION

It is an object to provide a feed apparatus which can monitor its own functioning in a direct and reliable way.

According to an aspect there is provided a feeding apparatus for supplying feed to a trough, the feeding apparatus comprises one or more feed dispensers having respective outlets, the feeding apparatus further comprising a slide, the slide being positioned below the outlets to receive feed falling from the outlets and guide the feed towards the trough and the slide comprises one or more impact detectors located below the respective outlets to detect impact of feed on the slide.

This is an advantageous and reliable way to detect if feed is actually dispensed by one or more of the feed dispensers. With a plurality of feed dispensers a plurality of impact detectors located below the respective outlets will advantageously be used too.

A plurality of feed dispensers are provided, such that different types and mixtures of feed can be provided. The feed provided to the trough may for instance depend on the animal that is to be fed. If a feed dispenser does not dispense any feed, no impact will be detected. Impact may be detected by determining if the measurement signal from an impact detector is above or below a predetermined noise threshold value. The noise threshold value may be determined by performing a noise calibration test where the sensor output when no feed falls is compared with sensor output when feed is dispensed. The noise threshold level is the level that is below the softest feed sort when dispensed.

It is also possible to perform a test with e.g. a visual check. Herein, the falling feed gives a certain signal in the relevant impact detector. Then, the threshold may be set at e.g. 10% of the signal thus measured. Preferably, the threshold is e.g. 10% of the maximum (saturated) signal of the detector. The threshold for detection may depend on, amongst others, the specific impact detector, as there is a large spread in properties of e.g. piezo-elements. It may also depend on the type of feed. Preferably, a test-run is performed, or the threshold value is determined and set, for each type of feed to be dispensed. It is noted that such a test-run also provides a check on which detector detects feed from which feed dispenser.

It is noted that the phrase "a plurality of impact detectors" means that the impact detectors are operatively provided with the slide, such that the impact of feed from a feed dispenser onto the slide will be detected under normal working conditions of the detector. This requires a suitable use of the detector, such as a physical coupling with or a maximum distance from the slide, etcetera, as will be known to the skilled person, and will be elucidated further below.

Providing a plurality of impact detectors provides more than just redundancy in detection. By providing a plurality of impact detectors, malfunction of a specific feed dispenser can be detected immediately, and/or its functioning well, by analyzing the readings from the different impact sensors, allowing an operator to quickly solve the problem. Also, malfunction of an impact sensor can be overcome by using the other impact sensors, for instance by extrapolating the readings of the other impact sensors. As the impact sensors are all provided in association with the same slide, the impact of feed falling on the slide may not only be detected by the impact sensor directly below the respective outlet, but also by the other impact sensors.

Therefore, in particular, each impact detector is positioned below one of the feed dispensers, such that feed dispensed from said one feed dispenser is aimed at said impact detector. Thus, for example if there are four feed dispensers, there are preferably, though not necessarily, also provided four impact detectors, each impact detector operatively provided for each feed dispenser. Note that it is still possible to provide more than one impact detector per feed dispenser, this providing an even greater level of redundancy and reliability, as long as each feed dispenser is specifically operatively provided with at least one impact detector. Also note that it is desirable for the feed dispensers and the slide to be provided and mutually positioned such that each dispenser dispenses its feed on a different location on the slide, as this increases the difference between impact determination by the impact detectors. Therefore, a plurality of feed dispensers dispensing into a single chute or duct, below which a slide is positioned, and which would cause all different feeds to be dispensed in a similar stream onto the slide would not quite lead to the presently discussed advantages.

By providing the impact sensors as part of the slide, impact can be detected in a reliable way, without requiring additional hardware elements being provided in the path of the feed.

The slide may have any suitable shape and orientation to allow feed to slide over its sliding surface under the influence of gravity. The slide may simply be a rectangular inclined plate. The side edges of the slide may be provided with raised edges. The side edges of the slide may taper towards each other in a downward direction, forming a funnel shape to direct the feed to the trough. The slide may further comprise guiding vanes or the like to guide the feed towards the trough.

In use, the feed will fall on the slide. Preferably, the feeding apparatus is setup in such a way that the feed falls from distance onto the slide creating a substantial impact that can easily be detected and distinguished by the impact detectors. But even when the feed does not actually fall but glides out of the feed dispenser and along the slide plate this may still be detected by the sensor and still produce an impact output. Calibration of the sensors for the noise threshold value, when done in the feeding apparatus will indicate if the sort of feed that is dispensed yields impact sensor data that are clearly different from the data when no feed is dispensed. When this is not the case this may mean that the feed needs to fall from a larger distance onto the slide then the tested distance. According to such an embodiment, the feed will fall on the slide.

The feed dispensers will each comprise a feed container, or at least be connectible to such a container. The feed dispenser may be provided with a metering unit to dispense an amount of feed, which may be a predetermined amount. The metering unit may be a simple valve to open and close the outlet. The metering unit may also comprise a dosing unit, such as a dosing container having an opening which can be rotated between a upward position in which the opening faces in an upward direction facing a hopper such that the container is filled, and a downward position in which the opening faces in a downward direction to dispense the feed to the slide. As the dosing container has a known volume, the amount of feed that is dispensed by each up and down movement of the dosing container is known. A dispensing action may comprise a predetermined number of up and down movements of the dosing container. Any other dosing unit, or metering unit, is also possible.

Advantageous embodiments are described in the dependent claims, as well as in the following part of the description. They are deemed non-limiting but only for further explanation of the invention and its advantages.

According to an embodiment there is provided a feeding apparatus wherein the slide comprises a sliding surface and the impact detectors are positioned under the sliding surface.

This is an advantageous position for the impact detectors as they can be positioned at or close to the point of impact where the feed hits the slide, without obstructing the feed.

According to an embodiment there is provided a feeding apparatus, wherein the impact detectors comprises one or more of a vibration sensors, a load cell, a piezo-element, a microphone, a g-force sensor, a capacitive sensor, an inductive sensor.

A piezo-element is in particular an advantageous way of providing a vibration sensor, as piezo-elements are reliable, robust, stable, cheap and small. Piezo-elements require low levels of energy to function and are active signal producing components. Furthermore, piezo-elements provide a linear response with respect to the impact, which simplifies data processing and subsequent computations. However, at least the other mentioned impact sensors may also be used in the present invention.

According to an embodiment there is provided a feeding apparatus, wherein the slide comprises a slide frame defining an opening and a detector module comprising the plurality of impact detectors and a detector wall, wherein the detector wall is arranged to be fitted into the opening of the slide frame to form the sliding surface.

This provides an advantageous way to form a slide. The detector wall can preferably be snugly fit into the opening of the slide frame, for instance by means of a snap-on connection. Once in place, the detector wall is preferably level with the opening, to form a smooth sliding surface.

The sliding surface may be made of stainless steel wear plate, or another suitable material. The housing of the detector module may comprise e.g. a plastic casing and a stainless steel detector wall. A PCB including piezo element or the like may be provided directly behind the detector wall.

The plurality of impact sensors are preferably inside the detector module, positioned directly behind or against the detector wall for good contact.

According to an embodiment there is provided a feeding apparatus comprising a control unit arranged to generate a start signal for one or more feed dispensers, and to collect measurement data from one or more of the impact detectors measured during a predetermined time interval in relation to the start signal.

Preferably, measurement data are collected from all the impact detectors. The time interval may run e.g. from the start of the dispensing action to a moment in time after the end of the dispensing action.

The measurement data may be read from a buffer comprised by the impact detector. Alternatively, the measurement by the impact detectors may be initiated triggered by the start signal.

The control unit may be arranged to generate a start signal for one or more feed dispensers and the control unit may be arranged to start collecting measurement data from one or more of the impact detectors triggered by the start signal. At the start of a dispensing action, the feed dispenser may open a valve or actuate a dispensing device or metering unit to initiate feed delivery. The feeding apparatus can now monitor and or measure feed dispension. The control unit may be arranged to continue collecting measurement data for a predetermined time interval. At the end of the feed dispensing action, the valve may be closed or the dispensing device may be stopped. After the end, feed will continue to hit the slide as the feed already released will need time (e.g. 0.3 s) to reach and leave the slide. Therefore, it is advantageous to continue collecting measurement data during a predetermined time interval after the end of the dispensing action, for instance during 1.5 seconds after the end of the dispensing action. This has the advantage that measurement data are collected over a relevant time interval.

The end of the feed dispensing action may be known beforehand, as the start signal may comprise information about the length of the feed dispensing action (e.g. 2 seconds). In that case the control unit may collect data during a time interval which is greater than 2 seconds, for instance 3 seconds.

Also, the end of the feed dispensing action may be indicated by a stop signal being generated by the control unit. So, the control unit may be arranged to control the respective feed dispenser to start and stop a feed dispensing action, the control unit being arranged to collect measurement data from the impact detectors from the start of the feed dispensing action to a predetermined time interval after the end of the feed dispensing action. After the generation of the stop signal, the control unit may continue to collect data for a predetermined time interval, e.g. 1 second.

Also, the end of the feed dispensing action may be indicated by the fact that no impact is detected anymore for a predetermined time interval, for instance during 1 second.

Continuing collection of measurement data after the end of the feed dispensing action is advantageous as feed may need time to reach and leave the slide.

The control unit may be a computer.

The above embodiment has the advantage that measurement data are collected by the control unit over a relevant time interval, i.e. a time interval in which feed is expected to impact the slide. The impact detectors may be arranged to measure impact continuously and buffer the measurement data in a local memory comprised by the impact detectors. The control unit may collect these measurement data by reading out this local memory. Alternatively, the impact detectors are idle until the control unit triggers them to start measuring impact and send the measurement data to the control unit. It is noted that the time interval may be extended, on either end, with a time period in which no feed impact signal but just noise will be measured. This offers an opportunity to do a null-measurement, for calibrating or the like. Other measurement and timing schemes are however also possible.

According to an embodiment there is provided a feeding apparatus wherein the measurement data collected from the one or more impact detectors comprise one or more of the group comprising: an average measurement reading from the one or more impact detectors over the predetermined time interval, a maximum measurement reading from the one or more impact detectors over the predetermined time interval. The control unit may in each case be arranged to collect such data as indicated, and/or to collect raw data and perform the indicated action (averaging etc.) on the data. Herein as in the following, the average measurement from the one or more impact detectors will often be a collection of average measurements, each from one of the impact detectors. Similarly, a maximum measurement reading from the one or more impact detectors will often be a collection of maximum measurements, each from one of the impact detectors. In each case, the collection of average or maximum measurements will then be available for further processing. However, it is not excluded to use a single average or maximum value, taken over all individual average or maximum values.

The average measurement reading from the one or more impact detectors over the predetermined time interval and the maximum measurement reading from the one or more impact detectors over the predetermined time interval may be determined by processing equipment comprised in the impact detectors or the detector module and sent to the control unit. Alternatively, the measurement readings are all sent to the control unit and the control unit is arranged to compute the average measurement reading from (each of) the one or more impact detectors over the predetermined time interval and/or the maximum measurement reading from (each of) the one or more impact detectors over the predetermined time interval.

According to an embodiment there is provided a feeding apparatus wherein the control unit is arranged to determine an impact signal on the basis of the measurement data of a plural selection of the impact detectors, and the control unit is arranged to generate a warning signal if the impact signal is outside a predetermined interval, such as below a predetermined first threshold or above a predetermined second threshold, the second threshold being greater than the first threshold. In such a control unit, due account can be taken of any impact that dispensed feed has on not only its intended corresponding impact sensor, but also on any of the other impact sensors. For example, when food associated with a first impact sensor is being dispensed, the first impact sensor will give a high signal. But the impact sensor(s) directly neighbouring the first impact sensor will often also give a still relatively high signal, and so on further and further away. E.g. by comparing the ratios of the signals of the various impact sensors, information can be gained about the validity of the signal of the first impact sensor, and so on.

Herein, the impact signal is based on the measurement data of a plural selection of the impact detectors. In other words, when calculating the impact signal, the measurements readings of at least two impact detectors are used. The calculation of determination of the impact signal may be done in various ways. For example, the impact signal may be an average of the measurement data of the plural selection, or a maximum value thereof, or a ratio of two measurement readings, or a plurality of ratios, and so on.

In embodiments, the average measurement readings of a selection of the impact detectors are averaged to determine an impact signal. By averaging the average measurement readings of a selection of impact detectors a reliable impact signal can be determined, in which measurement errors are substantially cancelled. The selection may comprise all impact detectors or a sub-set of the impact detectors which are closest to the outlet from which feed is being dispensed, such as the impact detector associated with that outlet, as well as one or two impact detectors on one or both sides of that impact detector. The selection may also comprise those impact detectors for which an average measurement reading is determined which is above a predetermined noise threshold.

In other embodiments, the impact signal comprises at least one ratio of the measurements readings, or averages thereof, of a plurality of impact detectors. In particular, the impact signal comprises a ratio of the averaged measurement reading of a first impact detector associated with a first outlet and the averaged measurement reading of a neighbouring impact detector. Due to mechanical coupling between the impact detectors, vibrations causing a measurement reading at the first impact detector will cause a certain measurement reading at the neighbouring detector(s), with a certain ratio. Such ratio may itself be an indication of the measurement reading of the first impact detector, giving an indication of the amount of feed dispensed. Or if such ratio differs from what is expected, an alarm signal may be generated.

In general, it is this impact signal, based on readings of the different impact detectors that forms a reliable signal based on which it can be determined e.g. if feed has actually been dispensed, or how much feed, et cetera. If the impact signal it too low, a warning signal may be generated as no or too little feed has been dispensed. If the impact signal is too high, a warning signal may be generated as too much feed has been dispensed, which e.g. indicates a malfunction of the metering unit.

The warning signal may be a visual or audible signal, but may also be a digital or analogue signal being sent (e.g. wirelessly) to a receiver, such as a remote computer or a telephone.

According to an embodiment there is provided a feeding apparatus wherein the control unit is arranged to determine malfunction of an impact detector by comparing the measurement data associated with that impact detector with the measurement data associated with the one or more other impact detectors. This is another use of the feature that there are a plurality of impact detectors associated with the same slide.

For instance, in case the measurement data of a certain impact detector, such as an average or maximum measurement reading, are different from what is expected based on the measurement data from other impact detectors, it can be concluded that that specific impact detector is defective. For instance, if an impact detector, that is associated with e.g. the feed dispenser that is dispensing feed, has an average measurement reading substantially equal to a noise level (or even lower), while its neighbouring impact detectors detect an average measurement reading well above the noise level, it can be concluded that that specific impact detector is defective. This may trigger a defect signal to warn maintenance staff. Also, if the ratio of measurement readings from two or more impact detectors differs from an expected value or range of expected values, such a warning signal may be supplied.

An important embodiment is one wherein, in the above case of an impact detector for which malfunction has been detected, the control unit is arranged to derive a measurement reading for that impact detector for which malfunction has been detected from at least one other measurement reading. In this, even though an alarm signal could be sent to inform about a defective impact detector, the feeding apparatus as a whole may still be used. When feed is dispensed from an outlet associated with the impact detector assumed defective, the associated measurement reading may be derived from e.g. a measurement reading of a neighbouring impact detector and a, previously determined, ratio between the former and the latter, or from measurement readings of a plurality of other impact detectors and their respective ratios. This clearly reduces down-time of the feeding apparatus. Note that this is different from simple redundancy by using two or more impact detectors per outlet.

According to an embodiment there is provided a feeding apparatus comprising a control unit, wherein the control unit is arranged to compare characteristics of the measurement data, like amplitude and frequency, with predetermined comparison data to determine the type of feed being dispensed.

Different types of feed will generate different measurement data. For instance, pelleted feed or other hard types of feed will typically have a relatively large impact, resulting in large amplitudes. Softer feed, like finely ground grains will typically have a smaller impact, resulting in a smaller amplitude than harder such as pelleted feeds.

The comparison data may be the result of calibration measurements and may be stored in a memory accessible by the control unit.

According to an embodiment there is provided a feeding apparatus comprising a control unit, wherein the control unit is arranged to compute an indication of the amount of feed dispensed based on the measurement data.

Based on the measurement data, the amount of feed or at least on indication thereof can be computed. For instance, the amplitude of the measurement data is an indication of the relative dispensing rate of the feed. When the type of feed is also known, or if some calibration has been performed, the absolute rate may also be assessed or determined by means of the measured amplitude. Furthermore, by integrating the amplitude of the measurement data over time, an indication of the total amount of feed dispensed can be computed.

According to an aspect there is provided a slide for use in a feeding apparatus, arranged to receive feed from a feed dispenser and guide the feed in a sliding manner to a trough, characterized in that the slide comprises a plurality of impact detectors to detect impact of feed on the slide. Again, as mentioned herein above, the phrase "the slide comprises a plurality of impact detectors" means that the impact detectors are operatively provided with the slide, such that the impact of feed from a feed dispenser onto the slide will be detected under normal working conditions of the detector. Preferably, each feed dispenser has at least one impact detector at which feed dispensed by said feed detector is aimed.

The slide may comprise a sliding surface, which in use is at an angle with respect to the horizontal and vertical direction and faces in an upward direction. The impact detectors are preferably located behind the sliding surface of the slide. The impact detectors may be attached to the rear surface.

According to an aspect there is provided a milking machine comprising a feeding apparatus or a slide according to any one of the preceding claims.

The feeding apparatus or slide as described above may advantageously be used in a milking machine. Animals are lured into the milking machine with the prospect of feed. Furthermore, the milking machine is often the only place, or at least an important place, where the animals are fed concentrate, which is an important part of their diet. It is therefore important to detect any malfunction of the feed dispenser in a reliable way. The milking machine may further comprise a trough which is mounted to the milking machine. According to an aspect there is provided a method of monitoring functioning of a feeding apparatus for supplying feed to a trough, the feeding apparatus comprising a plurality of feed dispensers having respective outlets, the feeding apparatus further comprising a slide, the slide being positioned below the outlets to receive feed falling from the outlets and guide the feed towards the trough, the method comprising initiating a dispensing action of at least one feed dispenser, wherein the slide comprises a plurality of impact detectors located below the respective outlets to detect impact of feed on the slide and the method further comprises collecting measurement data from at least one of the plurality of impact detectors at least during the dispensing action. Again, the phrase "the slide comprises a plurality of impact detectors" means that the impact detectors are operatively provided with the slide, such that the impact of feed from a feed dispenser onto the slide will be detected under normal working conditions of the detector. Preferably, each feed dispenser has at least one impact detector at which feed dispensed by said feed detector is aimed.

This is an advantageous way of monitoring if the feed dispenser is functioning properly.

The method may be performed under control of a control unit.

Measurement data may be collected by sampling at a single predetermined frequency. It has been found that the frequency spectrum of feed falling on the sliding member is relatively constant, so sampling of a single predetermined frequency will suffice, although sampling of a plurality of frequencies is not excluded. The predetermined frequency may for instance be 25, 30, 50, or 60 Hz. Such frequency depends, amongst others, on the type and dimensions of the impact detector, and possibly also those of the slide or housing of the detector(s). In another embodiment, in particular with piezo-elements as impact detectors in abuilt into a steel housing or slide, it has been found that the frequency for sampling (detecting) is preferably an audiofrequency, i.e. between about 20 Hz and about 20 kHz. This frequency depends in particular on the type of piezo-element and its resonance frequency. It may be optimised by performing a full spectrum analysis of the impact signal. However, it turns out that selecting a signal frequency for detecting, i.e. sampling at that frequency, sufficis to get reliable results.

Measurement data may be collected from the impact detector positioned below the outlet from which feed is to be dispensed. This ensures that reliable and accurate measurement data are collected. However, measurement data may also be collected from one or more of the other impact detectors. This provides more measurement data resulting in more reliable monitoring.

In addition, by providing two or more impact detectors, in particular associated with the same slide, monitoring can be done in a reliable way, even in case an impact detector is defective. For instance, in case the impact detector situated below the outlet from which feed is to be dispensed is defective, the functioning of that outlet can still be monitored by the measurement data collected by the other impact detectors, as has already been described above.

Also, by providing two or more impact detectors associated with different feed dispensers, it is possible to determine which one of the feed dispenser is not functioning properly, especially in case two or more outlets are operated simultaneously. This allows a quick repair.

According to an embodiment there is provided a method wherein initiating a dispensing action of at least one feed dispenser comprises generating a start signal for one or more feed dispensers and the method comprises starting collecting measurement data from one or more of the impact detectors measured during a predetermined time interval in relation to the start signal.

According to an embodiment there is provided a method wherein collecting measurement data from the one or more impact detectors comprises determining one or more of the group comprising: an average measurement reading from the one or more impact detectors over the predetermined time interval, a maximum measurement reading from the one or more impact detectors over the predetermined time interval.

According to an embodiment there is provided a method wherein the method comprises determining an impact signal by averaging the average measurement readings of a selection of the impact detectors and generating a warning signal if the impact signal is below a predetermined first threshold and/or above a predetermined second threshold, the second threshold being greater than the first threshold.

According to an embodiment there is provided a method wherein the method comprises determining malfunction of an impact detector by comparing the measurement data associated with that impact detector with the measurement data associated with the one or more other impact detectors.

According to an embodiment there is provided a method wherein the method comprises comparing characteristics of the measurement data, like amplitude and frequency, with predetermined comparison data to determine the type of feed being dispensed.

According to an embodiment there is provided a method wherein the method comprises computing an indication of the amount of feed dispensed based on the measurement data.

According to an embodiment there is provided a method wherein the method further comprises computing an indication of the rate of feed or the amount of feed dispensed based on the readings from the impact detector.

According to an aspect there is provided a computer program product comprising instructions which can be loaded by a computer device and when loaded enable the computer device to perform the method according to the above.

According to an aspect there is provided a computer readable medium comprising such a computer program product.

According to an aspect there is provided a computer device arranged to perform the method according to the above. The computer device may be the control unit mentioned above.

SHORT DESCRIPTION OF THE DRAWINGS

Figure 2A:
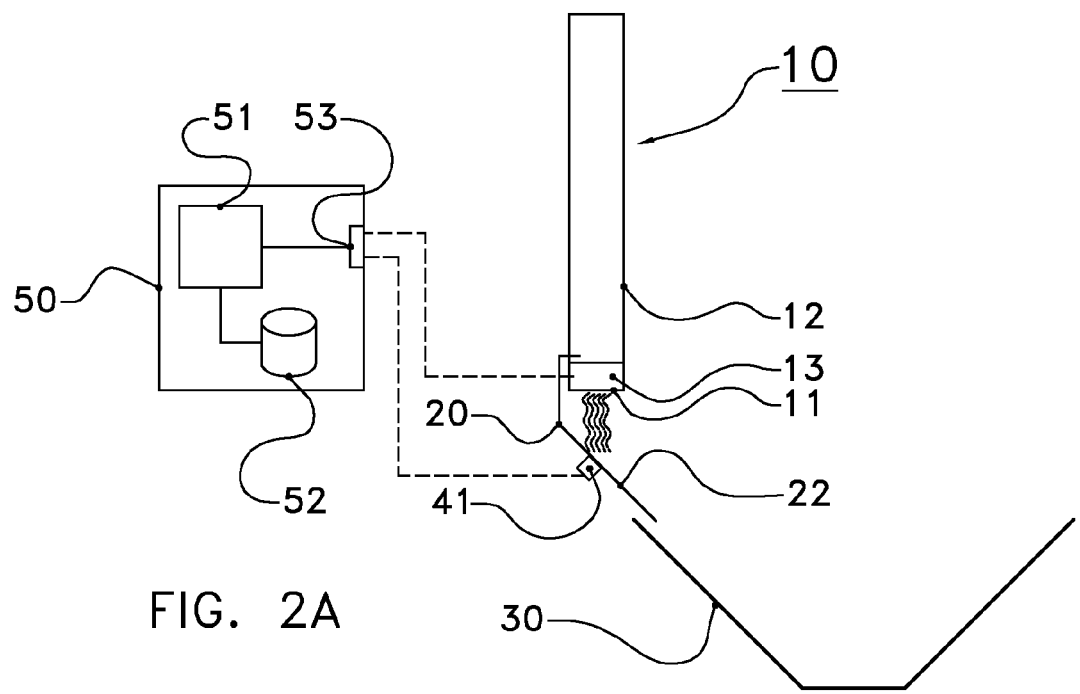
Figure 2B:
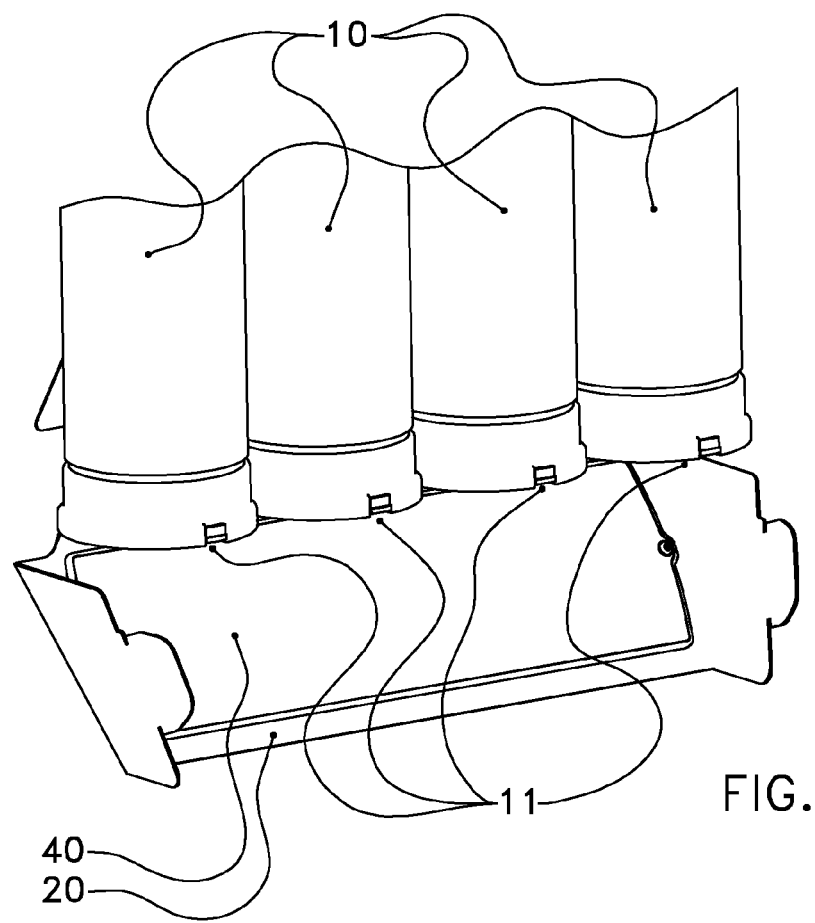
Figure 3A:
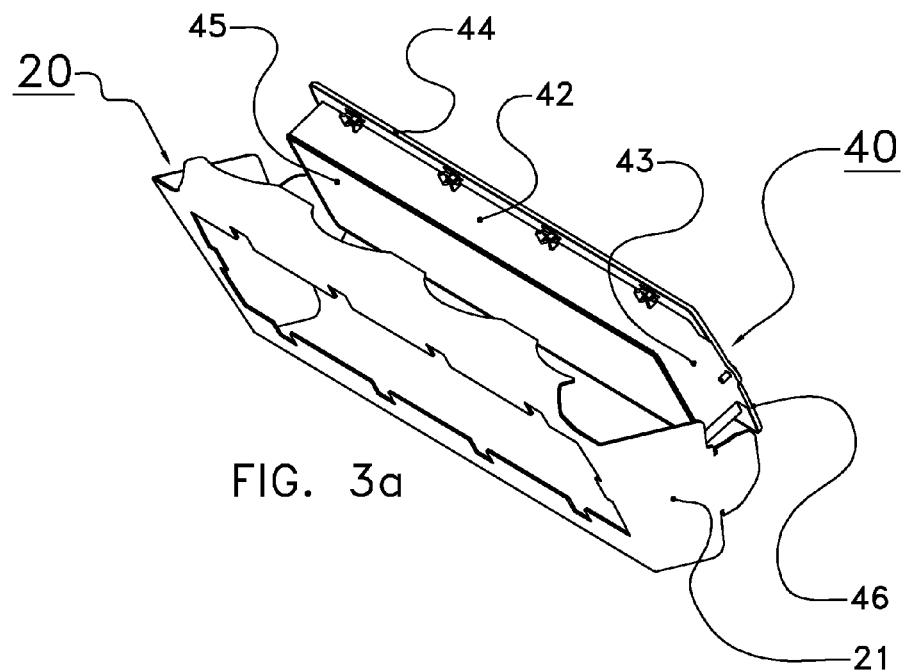
Figure 3B:
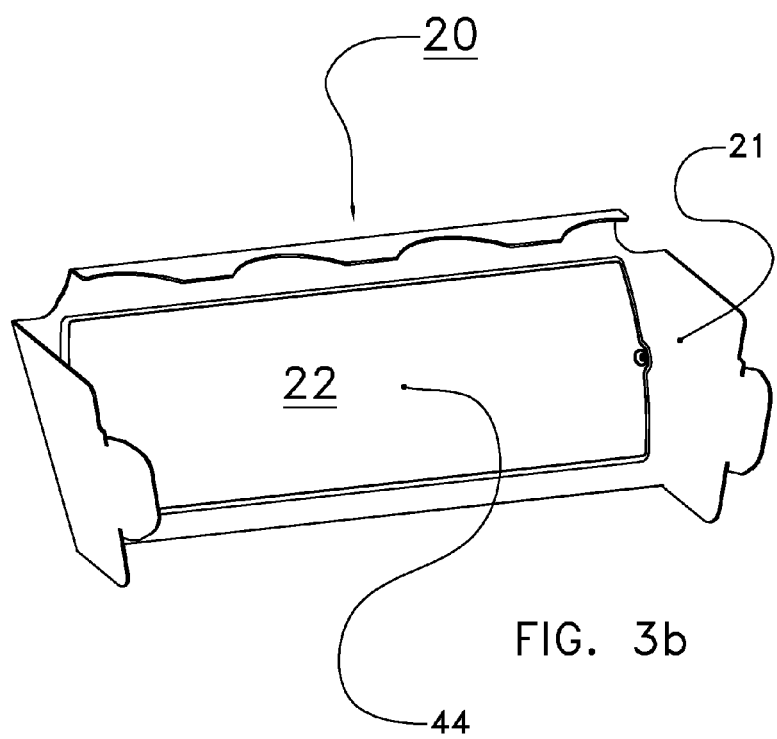
Figure 4A:
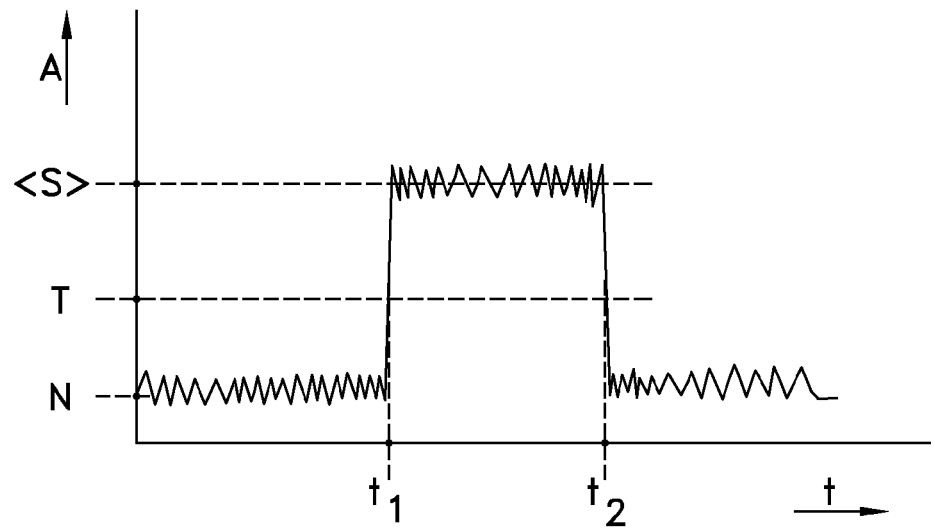
Figure 4B:
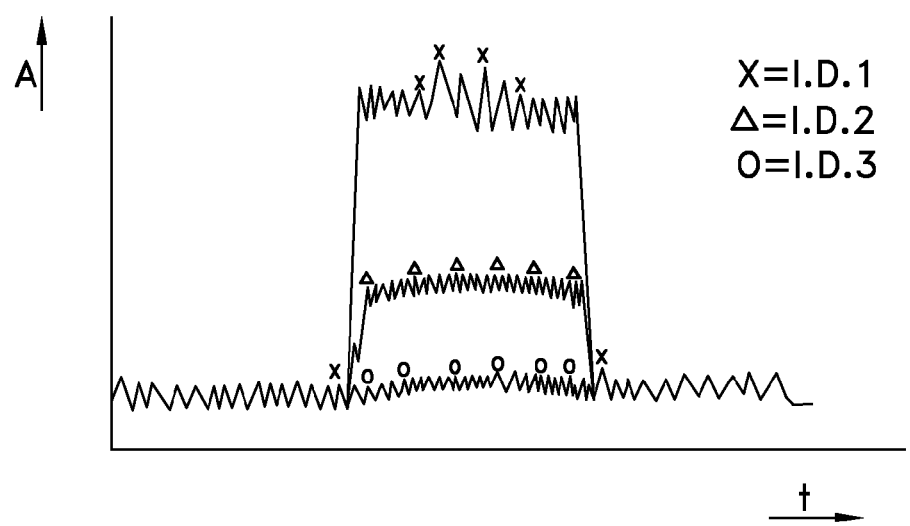

Embodiments will now be described, by way of example only, with reference to the accompanying schematic drawings in which corresponding reference symbols indicate corresponding parts, and in which:

FIG. 1 schematically depicts part a feeding apparatus,

FIGS. 2A and 2B schematically depict a feeding apparatus according to an embodiment, FIGS. 3A and 3B schematically depict a slide according to an embodiment and FIGS. 4A and 4B show schematical measurement readings.

DETAILED DESCRIPTION

Embodiments will be described with reference to the Figures.

FIG. 1 shows part of a frame 60 to which a feeding apparatus 1 is mounted. The frame 60 may be part of a milking machine or of a separate feeding station.

FIG. 2a shows a schematic cross-sectional view of such a feeding apparatus 1. The feeding apparatus 1 comprises a feed dispenser 10 having an outlet 11. The feed dispenser 10 comprises a hopper 12 in which feed is stored. Near the outlet 11 a metering unit 13 is provided for dispensing an amount of the feed.

Further shown is a slide 20 positioned below the outlet 11 such that feed dispensed by the feed dispenser 10 falls on the slide 20. The slide 20 may be mounted to the feed dispenser 10 to ensure correct positioning of the slide 20. The slide 20 may also be positioned separately from the feed dispenser 10.

The slide 20 is positioned to receive feed dispensed by the feed dispenser 10 and guide the feed in a downward and transversal direction to a trough 30. The trough 30 may be mounted separately from the feeding apparatus 1 and the slide 20, to minimize vibrations and forces exerted by the animal to the trough being transferred to the slide 20.

FIG. 2b shows a perspective view of the feeding apparatus 1, showing an embodiment comprising a plurality of feed dispensers 10, in this case four feed dispensers 10, all positioned above one slide 20.

FIG. 2a further shows slide 20, that also comprises four impact detectors located below the respective outlets to detect impact of feed on the slide, although only one such impact detector 41 is shown for clarity reasons.

Further shown is a control unit 50 which is formed as a computer device. The control unit 50 may be part of a milking machine and may control the milking machine, as well as monitoring the functioning of the feeding apparatus. Alternatively, the control unit 50 may be provided just for monitoring the functioning of the feeding apparatus and may communicate with a remote control unit controlling the milking machine. Alternatively the control unit 50 may be provided for controlling a separate feeding station which comprises the feeding apparatus. The control unit 50 is shown as a single unit, but it may also be formed by a number of cooperating control units. In particular when a plurality of feeding apparatuses are used in a single farm the control unit 50 may be formed by a plurality of cooperating control units with a central control by a farm management computer (which is then functionally also a part of the control unit 50).

The control unit 50 comprises a processing unit 51 and a memory unit 52. The processing unit 51 is arranged to communicate with the memory unit 52 to read and execute instructions stored in the memory unit 52 and store data in the memory unit 52 to provide the control unit 50 with the functionality according to the embodiments described. The control unit 50 further comprises an input-output module 53 to communicate with remote devices, such as with the feed dispensers 10, in particular the metering unit 13, to control dispensing of feed and with the one or more impact detectors 41 to initiate measurements and/or collect measurement data collected by the impact detectors 41. Communication between the control unit 50 and the remote devices may be wired or wireless.

The remote devices may also comprise a remote computer or control unit controlling the milking machine 60 or a remote computer or telephone of a user to send warning signals to.

As can be seen in FIG. 2a, the impact detectors are provided under the sliding surface. The impact detectors may for instance be integrated in the sliding.

The impact detectors 41 may for instance be provided as piezo-elements surface provided on a printed circuit board.

FIGS. 3a-3b depict the slide 20 in more detail. The slide 20 comprises a slide frame 21 in which an opening is provided, and a detector module 40 in which the impact detectors (not shown) are provided. The detector module 40 comprises a housing 42, the housing at least comprising a circumferential housing wall 43 whose outer circumference is shaped to match the opening in the slide frame 21 and a front detector wall 44 and a back plate 45. The detector module 40 can thus be positioned inside the opening of the slide frame 21 such that the front detector wall 44 forms a sliding surface 22 together with the part of the slide frame 21 surrounding the opening onto which the feed may impact when dispensed. FIG. 3a shows the slide 20 in together with the detector module 40 not yet assembled together. FIG. 3b shows the slide 20 together with the detector module 40 in an assembled state.

The slide frame 21 and the front detector wall 44 of the detector module and may be made from stainless steel. The other parts of the housing of the detector module may further be made from a plastic casing. The plastic casing may comprise a removable cover back plate 45 allowing access from the rear of the detector housing to the impact detectors (not shown) which are mounted to the rear or inner surface of the front detector wall 44, for instance for maintenance purposes. The housing may further comprise connectors 46 to connect the detector module 40 to an energy supply and possibly to the control unit 50.

In an embodiment the impact detectors are formed by piezo-elements which are mounted onto a printed circuit-board (pcb) which is then mounted to the rear of the front detector wall 44. The impact detectors may comprise processing equipment to process the measurement readings obtained. The impact detectors may for instance comprise a buffer to store measurement data during a predetermined time interval, the time interval being adjustable by a user, and may for instance be 2 seconds. Furthermore, the starting moment with respect to a feed dispensing start signal may also be set by the user, such as a certain time interval after said start signal. This ensures that measurement readings may be gathered both only in a relevant time window, and continuously during a relevant period of time, and are thus always available for the control unit to be collected. One could also say that the interval is set both as to length and starting point of time. The impact detectors 41 and/or the control unit 50 may further comprise processing equipment to compute an average measurement reading over the predetermined time interval and/or a maximum measurement reading over the predetermined time interval. These data may be computed continuously to be available for the control unit 50 to be collected anytime. These data may be available as the measurement data for the control unit 50. The maximum value may be used to check for pollution or deterioration detection unit, e.g. when the maximum measured value decreases over time this may indicate pollution or other detection problems. Also these values may be used for calibration.

The impact detectors 41 and/or the control unit 50 may further comprise amplification means to amplify the measurement readings and further data processing means, such as filters and convertors to process the measurement readings to a processable format. The impact detectors 41 may collect measurement readings at a predetermined and adjustable sampling frequency, e.g. of 25, 30, 50, or 60 Hz, and preferably a frequency between about 200 Hz and about 20 kHz.

The functioning of the embodiments will now be described in more detail.

After start-up of the feeding apparatus, the control unit 50 may send instructions to the impact detectors 41, comprising information about the required sampling frequency and time interval during which measurement readings are to be buffered. This is an optional action, as these values may also be pre-set.

The control unit 50 may initiate a dispensing action of at least one of the feed dispensers. This may for instance be done in response to detection of the presence of an animal in the vicinity of the trough 30. The animal may be identified using known identification techniques. Based upon the identification it can be determined whether or not feed is to be dispensed and if so, what type and quantity is to be dispensed.

After the dispensing action is initiated, measurement data are collected from at least one of the plurality of impact detectors 41 at least during part of the dispensing action, i.e. measurement data are collected that relate to a time interval which at least partially overlaps in time with the dispensing action. It could also start after a delay time of e.g. a number of milliseconds, during which feed is underway towards the slide and the impact detectors.

The control unit 50 may generate a start signal for one or more feed dispensers 10 and the time interval to which the measurement data relate is chosen in relation to the start signal. So, the measurement data preferably relate to a time interval starting at the moment the start signal is generated and ends after the dispensing action is ended, or sometime after that ending, as part of the feed will be on its way towards the slide. It is also possible to include a period of time before and/or after the feed dispensing action, during which period of time no feed will impact the slide. Such a period of time allows to determine a "null" measurement or noise level measurement, for reference.

After the control unit 50 collected the measurement data are collected by the control unit 50, an impact signal is computed to determine if enough feed has been dispensed. This is done e.g. by averaging the average measurement readings of a selection of the impact detectors (41). Next, this impact signal is compared to one or more predetermined thresholds and a warning signal may be generated based on the comparison if it is determined that too little or too much feed has been dispensed.

The first and second threshold signals may be pre-set and adjustable by a user and stored in the memory unit 52 of the control unit 50. The values may be chosen based on the set-up of the feeding apparatus 1 (e.g. vertical distance between metering unit 13 and the slide 20), a determined noise level and based on the type of feed stored in the different hoppers 12. As different types of feed may be stored in the different hoppers 12, the first and second threshold values that are applied may be selected based on the hopper 12 from which feed is to be dispensed. Information about the hopper 12 from which feed is to be dispensed may be comprised in the start signal or is at least available in the control unit 50. The warning signal may also comprise information about which hopper 12 is malfunctioning.

As a further action, the method the measurement data from the individual impact detectors 41 may be compared to the measurement data from other impact detectors 41, for instance the neighbouring impact detectors 41. As all the impact detectors 41 are provided in the same slide 20, the difference in the measurement data should not be too big. If the difference is greater than a predetermined threshold value and if such a difference is measured more than a predetermined times in a row, it may be concluded that the specific impact detector 41 is defect and an appropriate malfunctioning signal may be generated.

As a further optional action, further characteristics of the measurement data may be analysed, such as an amplitude of the measurement readings, a frequency of the measurement readings, an absolute value of the maximum measurement reading to determine the type of feed being dispensed. This information may be used to determine if the hopper 12 is filled with the correct type of feed.

As a further optional action, the amount of feed being dispensed may be determined based on the measurement data, such as based on an integration the signal over the measuring interval.

FIGS. 4A and B show schematical measurement readings.

In particular, FIG. 4A shows a measurement reading, or signal, A from one of the impact detectors. It can be seen that first there is just a noise level N, until time t1. Then, at time t1, the signal crosses the threshold level T, indicating in particular that feed is being dispensed from the associated outlet, and stays above that level until time t2, e.g. 8 seconds later. During this time period, the signal has an average value of <S>. After time t2, the signal drops again to the level of noise N. In this case, the control unit will conclude that feed has been dispensed from time t1 until time t2. Note that the measurement reading is the real-time, unaveraged signal. It would also be possible to take A as an averaged value, such as averaged over a suitable time period, e.g. 0.5 seconds. Although noise spikes will be leveled out, thereby not unduly triggering a feed dispensed measurement, but response time will increase.

The present measurement is taken at a certain frequency of vibrations, in particular around 50 Hz. It has been found by the inventors that the frequency dependence of the amplitude is very small, so that the exact frequency at which the measurement reading is taken is not critical. Also note that it is possible to determine the amount of feed dispensed, by integrating the value of A over the time between t1 and t2. This value is a good indication of that dispensed amount, and the correlation between the integrated value and the actual amount dispensed is easily determined by means of reference measurements, such as for different types of feed, heights from which the feed is dispensed, and so on. In particular, in FIG. 4A, the signal A between times t1 and t2 is shown to be practically a constant, and thus the feed will have been dispensed evenly. In the case that the feed is dispensed irregularly, the signal A will vary over time. Still, integrating the signal value will give a good indication of dispensed amount of feed.

FIG. 4B shows three measurement readings, for three different impact detectors 1, 2 and 3, indicated with a cross, a triangle, and a circle, respectively. In this case, feed is dispensed from the outlet associated with impact detector 1 (I.D. 1), while impact detectors 2 and 3 (I.D. 2 and I.D. 3) lie at different distances d2 and d3 from impact detector 1, with d3>d2. For example, I.D. 2 and I.D. 3 are associated with different outlets. This has as a consequence that the respective measurement reading, or signal, A is smaller for I.D. 2 than for I.D. 1, and smaller for I.D. 3 than for I.D. 2. The ratios between the signals from I.D. 1 and 2, and between 1 and 3, and between 2 and 3, are known quantities, at least after reference measurements, and possibly in dependence of the type of feed. Then, a number of conclusions may be drawn from the measurements shown.

First of all, the fact that the I.D. 2 and I.D. 3 give a reading at the same time as I.D. 1 is confirmation that indeed feed is dispensed at I.D. 1. Assuming now that I.D. 2 and 3 would give similar readings as shown, but that I.D. 1 would give a reading at noise level all the time, it may be concluded that I.D. is defective. Still an indication of the dispensed amount of feed could be obtained from the readings from I.D. 2 and 3, and their known ration. It is then possible, from the also known ratios between I.D.s 1 and 2 and/or 1 and 3, to calculate what the measurement reading from I.D. would have been, thus providing an indication of that amount of feed. Of course, it is not necessary to calculate the would-be signal for I.D. 1, as the readings for I.D. 2 and 3 and their ratio could also be used directly.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A feeding apparatus for supplying feed to a trough, the feeding apparatus comprises:
   at least one feed dispenser having respective outlets;
   a slide, the slide being positioned below the outlets to receive feed falling from the outlets and guide the feed towards the trough, wherein the slide comprises one or more impact detectors located below the respective outlets to detect impact of feed on the slide; and
   a control unit, wherein the control unit is arranged to compare characteristics of the measurement data, with predetermined comparison data to determine the type of feed being dispensed.

2. The feeding apparatus according to claim 1, wherein the slide comprises a sliding surface and the impact detectors are positioned under the sliding surface.

3. The feeding apparatus according to claim 1, wherein the impact detectors comprise one or more of a vibration sensor, a load cell, a piezo-element, a microphone, a g-force sensor, a capacitive sensor, and an inductive sensor.

4. The feeding apparatus according to claim 1, wherein the slide comprises a slide frame defining an opening and a detector module comprising the plurality of impact detectors and a detector wall, wherein the detector wall is arranged to be fitted into the opening of the slide frame to form the sliding surface.

5. The feeding apparatus according to claim 1, further comprising the control unit arranged to generate a start signal for one or more feed dispensers, and to collect measurement data from one or more of the impact detectors measured during a predetermined time interval in relation to the start signal.

6. The feeding apparatus according to claim 5, wherein the measurement data collected from the one or more impact detectors comprise one or more of the group comprising: an average measurement reading from the one or more impact detectors over the predetermined time interval, and a maximum measurement reading from the one or more impact detectors over the predetermined time interval.

7. The feeding apparatus according to claim 5, wherein the control unit is arranged to determine an impact signal on the basis of the measurement data of a plural selection of the impact detectors, and the control unit is arranged to generate a warning signal if the impact signal is outside a predetermined interval, wherein the average measurement readings of a selection of the impact detectors are averaged to determine an impact signal.

8. The feeding apparatus according to claim 5, wherein the control unit is arranged to determine malfunction of an impact detector by comparing the measurement data associated with that impact detector with the measurement data associated with the one or more other impact detectors.

9. The feeding apparatus according to claim 1, wherein the control unit is arranged to compute an indication of the amount of feed dispensed based on the measurement data.

10. A milking machine comprising the feeding apparatus according to claim 1.

11. A method of monitoring functioning of a feeding apparatus for supplying feed to a trough, the feeding apparatus comprising a plurality of feed dispensers having respective outlets and a slide, the slide being positioned below the outlets to receive feed falling from the outlets and guide the feed towards the trough, the method comprising the steps of:
    initiating a dispensing action of at least one of the feed dispensers, wherein the slide comprises a plurality of impact detectors located below the respective outlets to detect impact of feed on the slide;
    collecting measurement data from at least one of the plurality of impact detectors at least during the dispensing action; and
    comparing characteristics of the measurement data, with predetermined comparison data to determine the type of feed being dispensed.

12. The method according to claim 11, wherein initiating a dispensing action of at least one of the feed dispensers comprises generating a start signal for one or more of the feed dispensers and the method comprises starting collecting measurement data from one or more of the impact detectors measured during a predetermined time interval in relation to the start signal.

13. The method according to claim 12, wherein collecting measurement data from the one or more impact detectors comprises determining one or more of the group comprising: an average measurement reading from the one or more impact detectors over the predetermined time interval, and a maximum measurement reading from the one or more impact detectors over the predetermined time interval.

14. The method according to claim 13, wherein the method comprises determining an impact signal by averaging the average measurement readings of a selection of the impact detectors and generating a warning signal if the impact signal is below a predetermined first threshold and/or above a predetermined second threshold, the second threshold being greater than the first threshold.

15. The method according to claim 11, wherein the method comprises determining malfunction of one of the impact detectors by comparing the measurement data associated with that impact detector with the measurement data associated with the one or more other impact detectors.

16. The method according to claim 11, further comprising the step of computing an indication of the amount of feed dispensed based on the measurement data.

17. The method according to claim 11, further comprising the step of computing an indication of the rate of feed or the amount of feed dispensed based on the readings from the impact detector.

18. A computer program product embodied on a non-transitory computer readable medium and comprising instructions which can be loaded by a computer device and when loaded enable the computer device to perform the method according to claim 11.

19. A computer device arranged to perform the method according to claim 11.

* * * * *